United States Patent Office 3,367,181
Patented Feb. 6, 1968

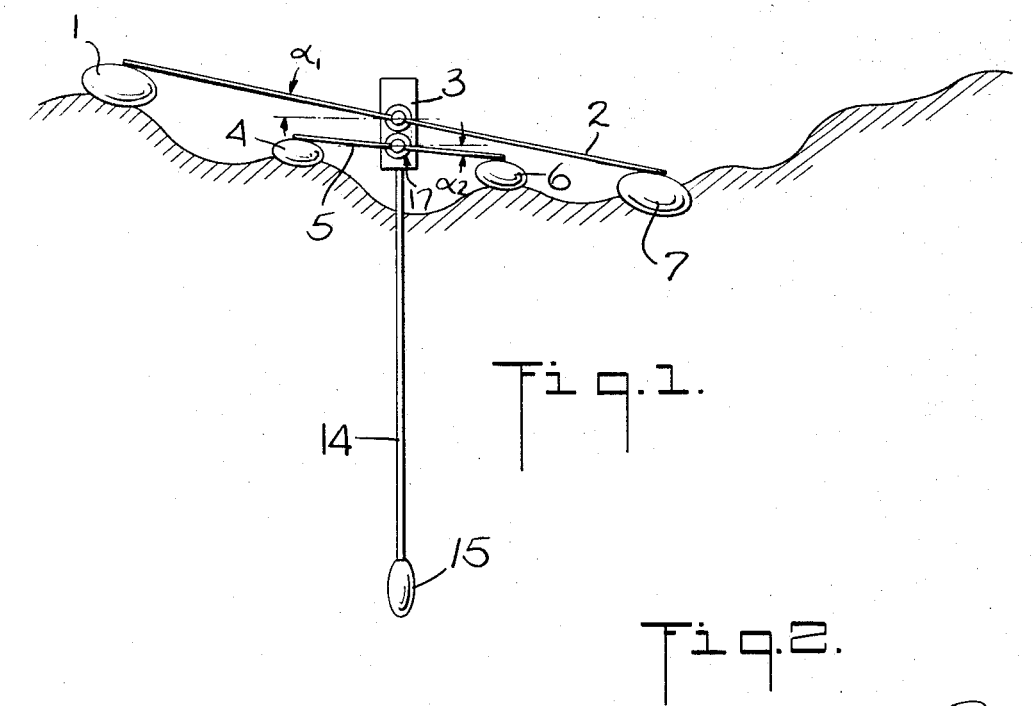
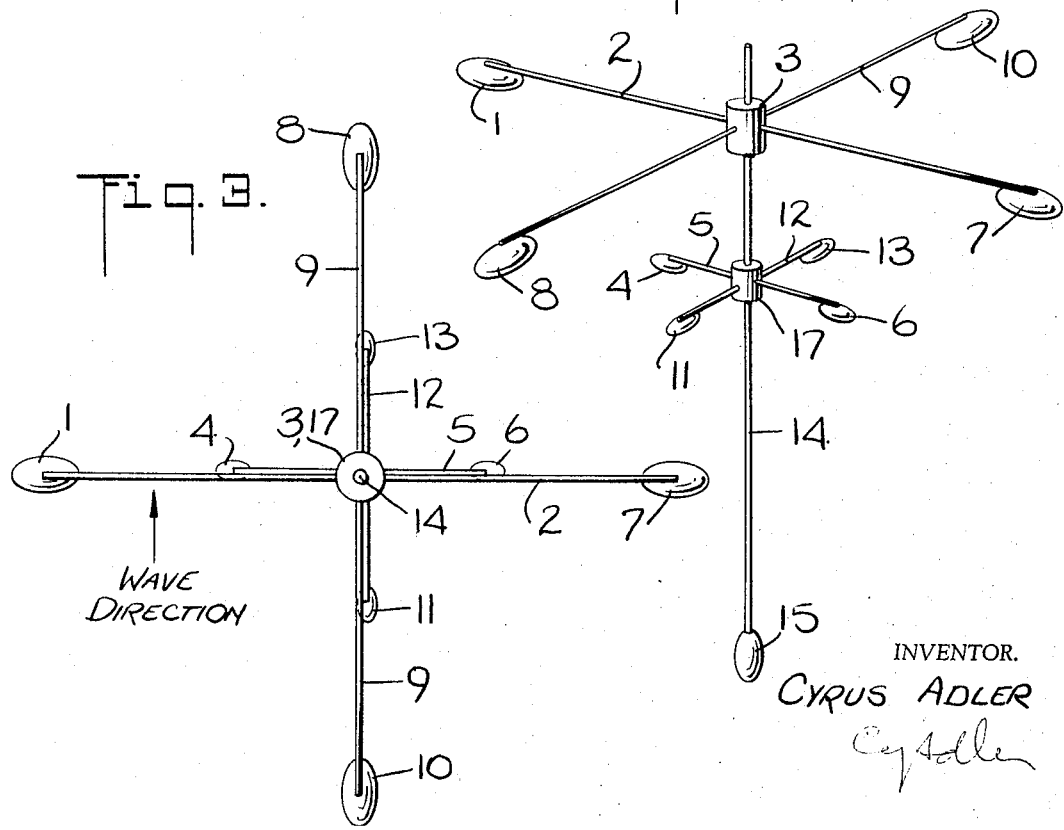

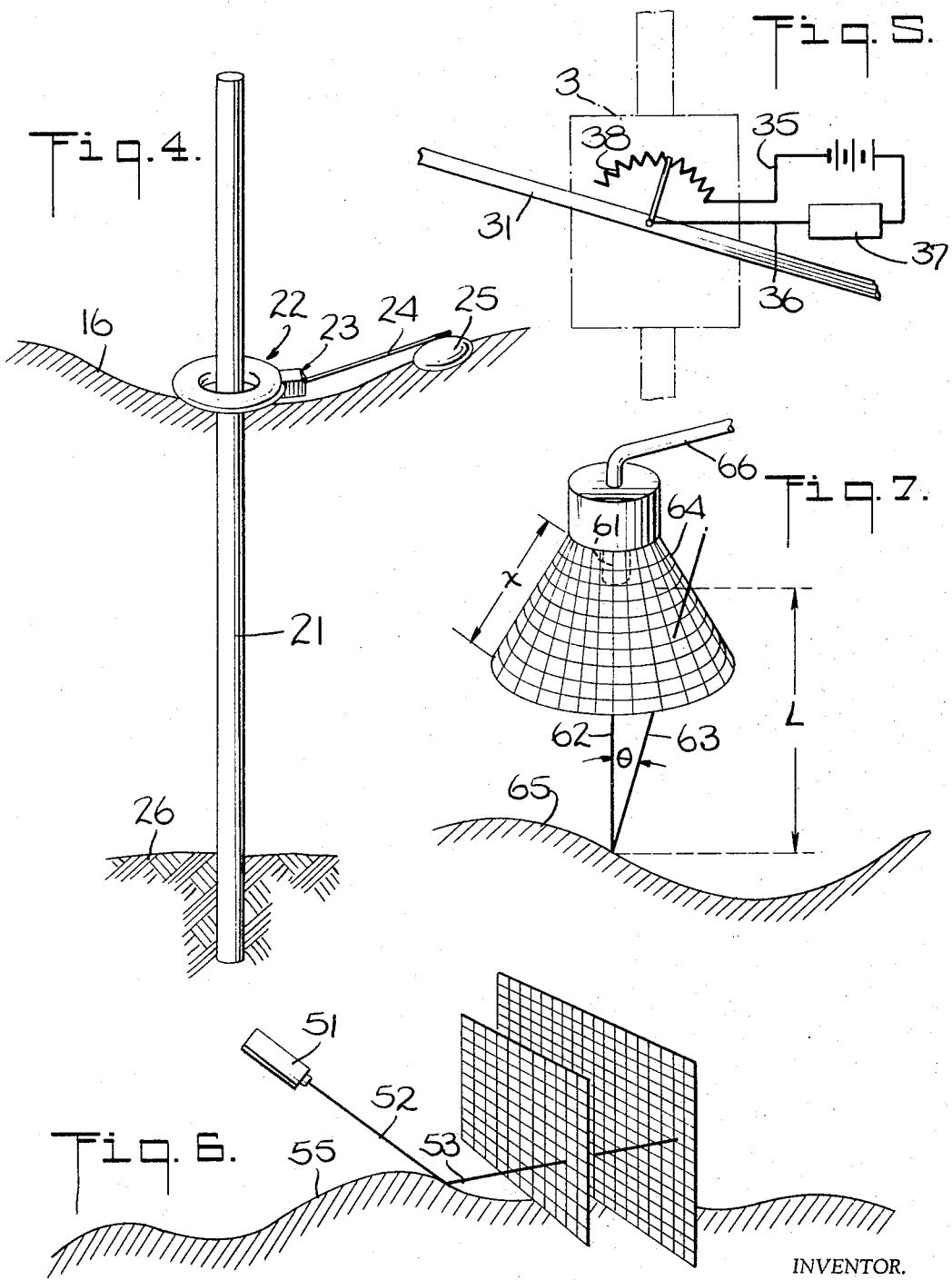

3,367,181
DIRECTIONAL WAVE SPECTRA
MEASURING DEVICES
Cyrus Adler, 317 W. 99th St.,
New York, N.Y. 10025
Filed Feb. 11, 1965, Ser. No. 431,942
10 Claims. (Cl. 73—170)

ABSTRACT OF THE DISCLOSURE

A device for measuring and recording the amplitudes, shapes, wave lengths, frequencies, and directional spectra of fluid waves.

The device consists of a plumb means, at least one buoyant arm pivoted to the plumb means, an inclinometer means for measuring the roll and tilt of the arms, a device for measuring the azimuth orientation of the arms, an accelerometer for measuring the vertical motion of the waves, integrators and recorders.

---

This invention relates to devices for measuring and recording the heights, shapes, wave length and frequency spectra of liquid waves.

A great need exists for sturdy, preferably simple devices for measuring the characteristics of water waves at sea. More accurate knowledge of waves on the open sea would facilitate shipping and naval operations. Since waves in one part of the ocean propagate to other regions, knowledge of the waves at selected points in the sea would make the overall wave prediction procedure much simpler.

In the November 1964 issue of Navy Research and Development Problems, Problem #G47–65 is: "Accurately measure transmit and record ocean surface wave height data with a wave height telemetering buoy in deep water." Reference is made to the "Splashnik," a device which uses a doubly integrated signal from an accelerometer to indicate wave height. The "Splashnik" is inadequate because the tilt of the buoy containing the accelerometer causes error and it does not give directional information.

The most irregular waves appear in a storm area, a "sea," where their frequency range is great. Most of the wave energy is concentrated in a small range of periods from five to nine seconds which depend on wind speed, direction and fetch. After leaving the "sea" area the waves travel as swells and their periods grow longer. Due to selective attenuation of the higher frequencies and dispersive effects, the swells develop periods of ten to thirty seconds at great distances from the storm sea.

Basic wave definitions and formulas

Water waves are influenced by capillary and gravity forces. When the wave length is over 1.74 cm., gravitational forces predominate and produce a somewhat trochoidal wave shape. Waves shorter than 1.74 cm. have generally rounded crests and are mainly influenced by the surface tension of the water. Often small capillary ripples will ride on the longer gravity waves playing an important role in transferring energy from the wind to the water.

The highest point of a wave is called the crest; the lowest point is called the trough. The distance from wave crest to trough is the height of the wave. For swell, the height is approximately twice the wave amplitude $a$. The distance between successive crests $L$ is called the wave length. The wave period $T$ gives the time required for two successive crests (or trough) to pass a fixed point. In a real sequence of sea waves $L$, $T$, and $a$ will vary from wave to wave in a random manner, and the wave form will be a complex combination of rounded and trochoidal shapes.

The classical hydrodynamic theory (Lamb, 1932) gives the phase velocity C of an ideal water wave as:

$$C = [(gL/2\pi) \tanh (2\pi h/L)]^{\frac{1}{2}} \qquad (1)$$

where $h$ is the depth of water and $g$ is the acceleration of gravity. In the deep sea, Equation 1 reduces to:

$$C = (gL/2\pi)^{\frac{1}{2}} \qquad (2)$$

while in water where $h < L$, the formula becomes:

$$C = (gh)^{\frac{1}{2}} \qquad (3)$$

From the above we see that in the open sea wave velocities are independent of depth and depend mainly on wave length; while shallow water waves slow down as they move over increasing depths. For the enormous wave length of tsunami, an ocean depth of 4000 m. is relatively "shallow." The above equations are approximate: in the sea the actual wave length is about two-thirds of that predicted by classical theory.

From a large sample of wave observations one can compute the average energy of waves. The energy per unit area of wave depends on its amplitude as follows:

$$E = \tfrac{1}{2} g \rho a^2 \qquad (4)$$

where $\rho$ is the density of water. The average energy is half kinetic and half potential. From wave observations we can predict the probability of the average, and the $\frac{1}{10}$ highest waves. If we know the direction in which the waves are traveling and their speed, we can predict the height and frequency of waves that will appear thousands of miles away (Pierson, 1955). For example, forty feet waves coming from a storm area will be twenty-five feet high five hundred nautical miles away, and will still be eight feet high three thousand nautical miles from the storm area.

Classification of waves

The wave spectrum found in the sea varies from minute capillary waves, through the ordinary wind driven gravity waves with periods of one to thirty seconds, to the longer gravity waves (Defant, 1961). The latter include so-called "tidal waves," which is reality are caused by earthquakes and are more properly called "tsunamis" and the diurnal and semidiurnal lunar and solar tidal waves are also longer gravity waves.

Capillary and ordinary gravity waves are generated by the wind. Other wave motions may be caused by varying atmospheric pressure. Seiches are special types of waves which are due to oscillations of water in enclosed basins.

Measuring instruments for ordinary wind generated waves

Since World War II, a number of wave measuring instruments have been developed for measuring ocean waves.

(1) Perhaps the simplest device is the wave staff or wave pole (Beach Erasion Board, an Office of the Army Corps of Engineers, 1948) (U.S.N. Hydro Office, 1955). Ideally, a wave pole stands or floats upright a fixed distance from the sea bottom. As the waves move up and down a time series record of the wave heights is recorded by a transducer stretched along the pole. This may be a resistance wire which is shorted out by the wave, or a capacitance which changes value as the water mounts between two wires.

While basically simple, the wave staff has a number of limitations. The element contacting the water tends to corrode or become covered with oil or jetsam. Furthermore, when the pole cannot be mounted rigidly, it is difficult to keep it at a fixed elevation or to prevent it from tilting. Such movements lead to erroneous readings. Recent attempts have been made to correct for tilt and heave by the use of accelerometers and integrated corrections but the remedy is expensive (Block, 1963). The Woods Hole Oceanographic Institute is developing a somewhat different wave pole consisting of a string of enclosed reed switches. A magnet set in a styrofoam torus rides up and down the staff closing the switch nearest the magnet.

(2) In shallow water, a pressure gauge lying on the bottom will indicate the height of the water above it and thus the sea level overhead. For a static column of liquid with density and height $h$, the pressure beneath the column will vary directly with the height of the column.

Many wave instruments employing pressure gauges have been built but they all suffer from the limitation that the shorter wave lengths are attenuated exponentially as the pressure variation travels downward through the water. It is impractical to use this device to measure ordinary wind waves in the deeper parts of the oceans, but Rauchelbach (1932) constructed a self-contained deep water pressure gauge that can indicate slow sea level changes.

(3) From three dimensional photographs of the sea surface, it is possible to determine wave heights and frequencies (Chase, 1957). The photographs can be taken from airplanes or from ships. This stereophotogrammetric method requires two accurately synchronized cameras and necessitates special and expensive data reduction techniques. However, using this method, it is possible to obtain wave spectra over a patch of sea surface that are presently unobtainable in any other way.

(4) Scientists at England's National Institute of Oceanography have developed a ship borne-wave recorder (Tucker, 1956) that can measure wave heights in the open sea when the ship is moving slowly or preferably stopped. Waves of periods from four to twenty-five seconds have been recorded. A pressure sensor attached to the hull below the water line reads the rough height of the wave above it. To eliminate the motion of the ship from the record, accelerometers on the ship record heave and pitch. The doubly integrated accelerometer outputs of these motions are then used to correct the raw wave record.

In the United States a ship-borne wave recorded is under development using a sound wave reflected from above the water wave instead of a pressure transducer to measure raw wave height (Mark, 1963).

(5) It is possible to measure the height of water waves acoustically in at least two different ways. If one knows that the sea bottom is perfectly level, then by beaming a sound pulse downward from a ship to the bottom and timing the returning pulse one can estimate the height of the ship from the bottom and hence the wave on which the ship is riding. Since sound disperses in water, this method has not proved very accurate.

Another acoustic method requires a submarine or submerged transmitting-receiver floating at a fixed distance beneath sea level. By beaming a sound pulse to the surface and recording the time required for the reflected pulse to reach the receiver, a record of wave heights can be obtained.

A submerged submarine used as a wave measuring platform (De Leonibus, 1963) has the advantages of maneuverability and of penetrating into high wave generating areas without being greatly affected by the wave motion. But a submarine may be made unstable due to the wave motion being measured. At present, if the submarine submerges to say, 300 ft. to counteract the effect of the waves, its acoustic instruments will respond only to lower wave frequency components due to the limited resolution of the sound beam.

(6) According to trochoidal wave theory, the particles in ocean waves move in circular or elliptical orbits which decrease exponentially with depth. The wave effects diminishes with depth as a function of wave length. Since L is directly related to the square of the wave period one can estimate the wave energy spectrum from a knowledge of the wave period.

Von Wald (1963) reports on a method in which one employs a vertical array of pressure transducers is hung from a telemetering buoy. This system depends on the fact that the vertical pressure gradient under a wave crest is less than under a wave trough. The output of the transducer string is then integrated "colorimetrically" to give an indication of the wave energy.

(7) Airborne wave meters are being actively developed (Pelloquin, 1963). These have the advantage of covering large areas of sea in a relatively short time. But they are still expensive and not too accurate. These devices usually operate by timing the flight of a reflected radio wave. In another interesting type of airborne system, the water waves act as a complicated diffraction grating (Barber, 1962); the reflected radio waves are due mainly to a single long crested wave train travelling at right angles to the axis of the radio wave which is twice the wave length of the water wave. By varying the radio transmitter frequency one can selectively determine water wave frequencies.

(8) Another wave recording system employs raft-mounted accelerometers. Developed at the David Taylor Model Basin the original "Splashnik" (Marks and Tuckerman, 1960, 1963) used one accelerometer whose doubly integrated output varies the frequency of a simple F.M. oscillator. This device was designed to be expendable. It suffered from the fact that the raft did not strictly heave with the wave but also tilted giving erroneous readings. Improvements are underway to correct for tilt by using three perpendicular accelerometers.

Perhaps the most advanced wave measuring instrument of this type in use today was developed at National Institue of Oceanography of Great Britain (Longuet-Higgens, 1963, Cartwright, 1964). By measuring the heave pitch and roll of a floating buoy, the developers were able to form the directional spectra of the underlying wave. From these, one can write the first five terms of the Fourier expansion of the angular distribution of energy of the wave at a particular frequency. By varying the frequency one can develop the entire energy spectrum.

The need still exists for an inexpensive dependable and preferably disposable wave meter. It should be rugged so that it can be used in rough seas. Only when such an instrument is available will one be able to quickly predict the sea environment.

The general objects of my inventions are to produce a device which will record the shapes, heights, and frequencies of any type of fluid wave, including water waves in the open sea, as well as near shores and on inland water waves; which will continuously record and/or transmit the wave record to receiving stations for an extended period of time; will not be adversely affected by rough wave conditions which may be encountered in use; and which can be operated by attendants with limited scientific training.

A further object is to provide devices which will indicate the direction in which the waves are travelling.

A further object is to provide devices that because of their basically simple nature will be expendable.

Further objects and advantages are to be found in the construction and arrangements of parts as will be described in the specifications hereinafter and in the appended claims.

In the drawings accompanying this specification:

FIGURE 1 is a view in section of the "Spider" wave measuring device riding on the waves showing two beams of different length parallel to each other;

FIGURE 2 is a three dimensional diagram of the "Spider" apparatus showing two pairs of beams perpendicular to the plumb line rod;

FIGURE 3 is a top view of the "Spider" apparatus;

FIGURE 4 is a variation of the "Spider" apparatus when a fixed pole is substituted for the pendulum in shallow waters;

FIGURE 5 shows one method for translating the angular movement of a cross beam into an electrical signal;

FIGURE 6 shows a light beam reflected from a wave striking two arrays of photo sensors;

FIGURE 7 shows a compact arrangement of beam source and a cylindrical sensor array.

Description

Similar numerals refer to similar parts throughout the several views.

The wave measuring device (FIGURES 1 through 6) is called a "Spider" because of its rotating beam arms which stick out from the narrow body of the plumb line resemble the shape of a spider when viewed from above. Basically the "Spider" consists of a cross beam 2 which has floats 1 and 7 at both ends; or the beam may be completely buoyant throughout. An example of the latter embodiment is an aluminum pipe capped at both ends. From the center of the beam hangs a plumb line; in FIGURE 1 this is a hanging weighted rod 14 with a plumb bob 15. This is a physical pendulum hanging perpendicularly in the water. The pendulum rod is free to move only in the vertical plane of the floating beam. The purpose of the pendulum is to indicate verticality. A gyroscopic device could be similarly employed. An inclinator 3 which may be a potentiometer or equivalent angle measuring recording device, is fixed rigidly between the beam and the pendulum rod. Hence, when the beam tilts to follow the contours of the waves on which it floats, the inclinometer varies accordingly giving a continuous record of wave slope.

FIGURE 1 shows a side view of the Spider with two floating cross beams 2 and 5. Two or more beams of different lengths can be used to accentuate different wave length components.

Floats 1 and 7, at the end of the longer beam 2, are tilted at angle $\alpha_1$. The shorter beam 5 moving in response to the shorter surface waves is shown at a different angle $\alpha_2$. Separate inclinometers at the intersections of the plumb mechanism and the several cross beams give separate indications of the respective beam motions. The inclinometer 17 for beam 5 is shown in FIG. 1. As the beams follow the waves 16 the inclinometers produce varying signals directly proportional to the tilt of the beams and thus to the wave inclination.

FIGURE 2 is a perspective view of a Spider with eight floats. The two longer arms 2 and 9 are constrained to move perpendicularly to each other and to the plumb line 14. The two shorter arms 5 and 12 are constrained to move perpendicularly to each other and to the plumb line 8. In this manner wave motions moving at right angles to the predominant wave train could be studied in greater detail. Two inclinometers are housed in cylinder 3, and two different inclinometers are housed in cylinder 17.

FIGURE 3 shows a top view of the apparatus of FIGURE 2. The floats, 1, 7, 8, 10, 4, 6, 11, and 13 are paired so as to keep the "Spider" oriented in the direction of the major waves. In a sea where the waves are more or less regular, the floats should align themselves parallel to the wave fronts.

An integral component of the Spider instrument is an accelerometer placed in the upright casing near the potentiometer or in the floats. By twice integrating the output of this accelerometer, the wave height can be directly calculated and used in combinations as explained later to derive the directional spectrum of the waves.

A north seeking compass magnet mounted with the inclinometer package indicates true north. The horizontal angle of deviation of the arms from true north could thus also be indicated.

One way to accomplish the recording compass is to attach a north seeking magnet to a pivoted capacitor plate. The other capacitor plate is fixed to the vertical plumb line. Then the output capacity with vary with the angular shift of the plumb line with respect to true north. Thus the true azimuth can be derived.

Another way to make a recording compass consists of using a north seeking magnet to move the slug in an oscillator coil which is fixed to the plumb line.

FIGURE 4 shows an arrangement for measuring shallow water waves. The basic instrument idea is maintained but here a smooth pole 21 is fixed in the sea floor 26. A torus 22 is free to move up and down the pole. An inclinometer 23 is attached between the torus and a beam 24 which is connected to a float 25. As a wave 16 moves beneath the torus and float the wave motion is recorded by the inclinometer. A compass magnet and an accelerometer can be incorporated into the inclinometer housing when more than just wave period and slope are desired.

FIGURE 5 is one simple arrangement for translating angular motion of a beam with respect to the vertical into an electrical signal. A potentometer arm 33 is rigidly connected to the tilting beam 31 which is pivoted at 34 to a plumb line 32. As the beam tilts, the potentiometer arm slides over the resistance wire 38 causing a variable current flow in conductors 35 and 36 to the recorded 37. A variety of other ways exist for measuring angles such as having the beam move a capacitor plate, or changing the angular motion into linear motion and using, strain guages, differential transformers, etc.

If the beam equals the length from wave peak to trough, then the height of the wave H will be equal to the length of the beam multiplied by the sine of the included angle. This ordinarily will not be the case. But when the beam length is substantially shorter than half the wave length, the inclinometer output will give the tangent of the wave profile, i.e., the inclinometer output will indicate the first derivative of the wave height $dy/dx$ plotted against time. For a wave front velocity parallel to a given beam $dy/dx$ can be integrated to give the exact wave profile and height. We assume the horizontal motion of the Spider will be small.

The period of the wave is obtained from considering the time between points where $$\frac{dy}{dx}=0$$

The period T is twice the time between such points.

It is not difficult to constrain two pivoted members so that they move in the same plane. For example, a pivot bolt through a cross beam and the upright would assure the vertical rotation of the cross beam.

An extension of the rod above the water surface can act as a staff for anemometers, and as an antenna for transmitting data. The signals from the inclinometers, compass, and accelerometers could be used to vary the frequency or amplitude of transmitted radio signals. Instead of a variable resistance as shown in FIG. 5, a variable capacitor, e.g., the simple air dielectric type used in standard receivers, could be used to vary the resonant point of a tank circuit in the grid circuit of an F.M. oscillator. This signal could then be transmitted to a receiving station.

The basic theory behind operation of the Spider and the reflective wave measuring device is as follows:

Let us call Z the elevation of the wave surface above or below a level sea surface. Then $Z_{tt}$ is the vertical acceleration of the surface wave and $Z_x$ is the change of wave height in the $x$-direction, e.g., eastward, while $Z_y$ is the change of wave height in the $y$ or northerly direction. Let us call $C_{mm}(w)$ the cospectrum and $Q_{mm}(w)$ the quadrature spectrum with respect to circular frequency $w$ between signals $$Z_{tt}=S_k, Z_x=S_2 \text{ and } Z_y=S_3$$

The directional energy spectrum of the waves is $$S(w, \phi) = E(w) \cdot F(\phi)$$
$$= \tfrac{1}{2}\pi + \Sigma(a_n^-(w) \cdot \cos\phi + b_n^- \sin\phi)$$

where the frequency spectrum $E(w)$ has the property that $$\int_0^\infty E(w)dw = \text{variance of waves}$$

and $$\int_\pi^\pi F(\phi) = 1$$

If we assume a Fourier expansion for the directional wave spread, i.e., $$F(\phi) = \frac{1}{2\pi} + \frac{1}{\pi}\sum_1^\infty (a_n \cos n\phi + b_n \sin n\phi)$$

then the first 4 to 6 Fourier coefficients can be obtained from combinations of the quad- and co-spectras; which, in turn, are derived from the signals of wave scope, azimuth and acceleration in the Spider buoy.

Another means of determining the slope and direction of fluid waves consists of reflecting a collimated beam or ray of pressure or electromagnetic waves from the wave surface, and noting where the beam goes. This technique we will refer to as REWAM for "reflective wave measurer." FIGURE 6 shows a source 51 of collimated particles or rays 52 reflecting from a wave 55 and striking a detector array 54. We assume that the source 51 and detector array 54 are fixed with respect to the moving waves 55. Depending on the height and inclination of the wave the reflected beam 53 will strike the array in a particular region. By noting this region one can deduce height and slope information about the waves.

The beam could be acoustic, electromagnetic, or particulate in composition.

By using two parallel detector arrays the exact angle of the reflected ray can be determined. The reflected ray would be of sufficient strength to pass through the first array 54 and strike the second array 55 in FIGURE 6. By comparing the strike regions of both arrays one would know the angle at which the reflected ray left the fluid surface. Also one could deduce the height.

FIGURE 7 shows a compact unit construction of the REWAM device. Here the source of the collimated beam or ray 61 is rigidly attached to a conical array of beam or ray sensors 64. The emergent beam 62 strikes the fluid surface 65 and the reflected beam or ray 63 strikes the array 64 at a point determined by the height and slope of the waves.

The maximum of wave height to wave length before breaking is about 1:7. Therefore for a device L ft. above the water surface the side of the cone would have to be $$\tan 2\theta L \approx .32L$$

If the REWAM is held rigidly by a bar 66 fixed to a ship or fixed to a spar buoy 10 feet above the water then the cone would have to be about 3.2 ft. long. For capillary waves which are extremely hard to measure at sea a much smaller cone would be used.

I claim:

1. A device for measuring fluid waves comprising:
   a plumb means for establishing a vertical reference,
   at least one buoyant arm connected and connecting to said plumb means, said arm being movable, vertically pivotable about the point of connection between the plumb means and the arm,
   inclinometer means for indicating the angular position of said arm relative to said plumb means,
   a recorder for recording said relative position so that the wave characteristics may be determined.

2. A device for measuring fluid waves of claim 1 is further characterized by:
   a compass at a fixed position relative to said arms to give an indication of azimuth of arm orientation, said compass indication being correlatively recorded along with relative position of said arm.

3. A device for measuring fluid waves as characterized in claim 1 further characterized by an acceleromoeter mounted at the end of said buoyant arm, and means for recording the signal from the accelerometer correlatively along with the relative position of said arms.

4. A device for measuring fluid waves as characterized in claim 1 further characterized by an accelerometer mounted near the pivot point of the buoyant arm, and means for recording the signal from the accelerometer correlatively along with the relative position of said arms.

5. A device for measuring fluid waves comprising:
   a first buoyant arm,
   a second buoyant arm,
   a plumb means connected to said arms to provide a vertical reference,
   said second buoyant arm being free to rotate in a vertical plane only with the constrain that the plane determined by the said first buoyant arm and said plumb means is perpendicular at all times to the plane defined by the said second buoyant arm and said plumb means,
   inclinometer means to provide a first signal indicating the angle between said first arm and said plumb line, and a second signal indicating the angle between said second arm and said plumb line.

6. The device for measuring fluid waves of claim 5 is further characterized by:
   a compass at fixed position relative to said arms to give an azimuth indication of arm orientation.

7. A device for measuring fluid waves comprising:
   a first arm,
   a second arm,
   floats, one each, at the ends of said arms, a plumb line means connected to said arms to provide an indication of verticality,
   said arms being free to rotate relative to one another with the constraint that the plane formed by the axis of said first arm and said plumb line remains perpendicular at all times to the plane formed by the axis of said second arm and said plumb line, and
   inclinometer means to provide a first signal indicating the angle between said first arm and said plumb line and a second signal indicating the angle between said second arm and said plumb line.

8. The fluid measuring device of claim 7 wherein each of said floats has an elliptical shape; the major axes of all the floats being substantially parallel to one another.

9. A device for measuring fluid waves comprising:
   a first buoyant arm,
   a second buoyant arm,
   a third buoyant arm,
   a fourth buoyant arm,
   a plumb line connected to said arms to provide a vertical reference,
   said first buoyant arm being free to rotate relative to said second buoyant arm with the restriction that the plane formed by the axis of said first buoyant arm and said plumb line remains perpendicular at all times to the plane formed by the axis of said second buoyant arm and said plumb line,
   said third buoyant arm being free to rotate relative to said fourth buoyant arm with the restriction that the plane formed by the axis of said third buoyant arm and said plumb line remains perpendicular at all times to the plane formed by the axis of said fourth buoyant arm and said plumb line,
   the length of said third and said fourth buoyant arms being substantially less than the length of said first and said second buoyant arms, and
   inclinometer means to provide a first signal indicating the angle between said first arm and said plumb line,
   a second inclinometer to indicate the angle between said second arm and said plumb line,
   a third inclinometer to indicate the angle between said third arm and said plumb line, and a fourth inclinometer to indicate the angle between said fourth arm and said plumb line.

10. A device for measuring fluid waves characterized by:
- an upright pole imbedded in the ground beneath shallow water as an indicator of verticality,
- a floating torus-shaped member that can move vertically on the said upright pole,
- a movable rod extending horizontally out from and pivoted to the said torus-shaped member, said rod being free to move only in a vertical plane,
- a float at the end of the rod,
- an inclinometer fixed at the junction of the rod and the torus-shaped float for measuring the inclination of the rod,
- an accelerometer attached to either float,
- an azimuth indicator,
- a recorder for recording the wave inclination, azimuth information, and accelerometer output.

References Cited

UNITED STATES PATENTS

| | | | |
|---|---|---|---|
| 433,167 | 7/1890 | Glover | 33—144 |
| 1,746,828 | 2/1930 | Gelatt | 73—311 |
| 2,761,320 | 9/1956 | Duntley | 73—170 |
| 2,902,683 | 9/1959 | Wheeler | 73—308 |
| 3,110,178 | 11/1963 | Marks et al. | 73—170 |
| 3,224,000 | 3/1964 | Melas | 73—308 X |
| 3,203,236 | 8/1965 | Prince | 73—170 |

FOREIGN PATENTS 601,334  2/1926  France.

RICHARD C. QUEISSER, *Primary Examiner.*

JAMES GILL, *Examiner.*

J. J. SMITH, JERRY W. MYRACLE,
*Assistant Examiners.*

UNITED STATES PATENT OFFICE
CERTIFICATE OF CORRECTION

Patent No. 3,367,181                              February 6, 1968

Cyrus Adler

It is certified that error appears in the above identified patent and that said Letters Patent are hereby corrected as shown below:

In the heading to the printed specification, line 4, "317 W. 99th St.," should read -- 241 W. 97th St., --. Column 7, line 19, "scope" should read -- slope --.

Signed and sealed this 2nd day of September 1969.

(SEAL)
Attest:

Edward M. Fletcher, Jr.                        WILLIAM E. SCHUYLER, JR.
Attesting Officer                                    Commissioner of Patents